United States Patent
Salamon et al.

[15] 3,663,879
[45] May 16, 1972

[54] CIRCUIT FOR DETERMINING DEFECTIVE CONTROL CIRCUITS IN A PLURAL CIRCUIT FLIGHT CONTROL SYSTEM

[72] Inventors: Wolfgang Salamon; Werner Fath, both of Bremen, Germany

[73] Assignee: Vereinigte Flugtechnische Werke-Fokker GmbH, Bremen, Germany

[22] Filed: Aug. 18, 1970

[21] Appl. No.: 64,750

[52] U.S. Cl. ..................................................318/564
[51] Int. Cl. .....................................................G05b 9/02
[58] Field of Search................................................318/564

[56] References Cited

UNITED STATES PATENTS

| | | | |
|---|---|---|---|
| 3,190,586 | 6/1965 | Righton | 318/564 X |
| 3,369,161 | 2/1968 | Kaufman | 318/564 X |
| 3,405,337 | 10/1968 | Popik | 318/564 X |

*Primary Examiner*—Benjamin Dobeck
*Attorney*—Smyth, Roston & Pavitt

[57] ABSTRACT

In a flight control redundancy system for aircraft, any two control circuits that remained operative after dropout or others, are connected to provide sum and difference of their outputs, the sum to provide actuator control, the difference to detect any error in the operation of one of the two circuits. In case of such error, resulting reaction together with polarity of error detection is used to select the faulty one and disconnect same from the system, so that actuation control is provided by the remaining circuit alone.

9 Claims, 1 Drawing Figure

Patented May 16, 1972
3,663,879
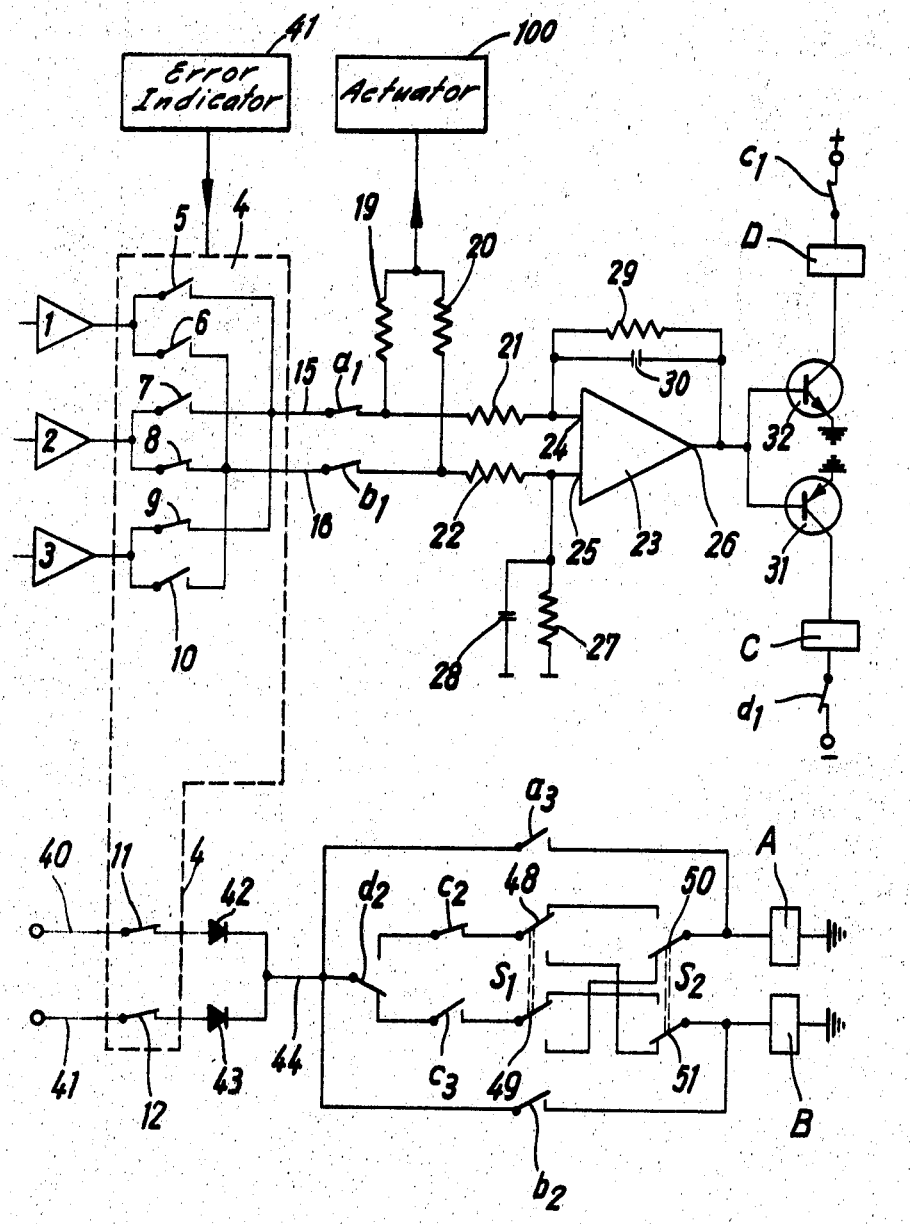

CIRCUIT FOR DETERMINING DEFECTIVE CONTROL CIRCUITS IN A PLURAL CIRCUIT FLIGHT CONTROL SYSTEM

The present invention relates to a circuit for the determination and disconnection of a second faulty control circuit after a first faulty control circuit has already been disconnected from a flight control system which has three (or more) parallel operating control circuit for establishing a redundancy system. In case of errorless operation of all circuits, they provide common control and actuation operation.

For reasons of safety, redundancy of flight control operation is necessary. In particular, two or more control circuits are provided to operate in parallel for actuation of a control surface of the craft. The requirement for such a redundancy is particularly important in case of vertically starting and landing aircraft, because such an aircraft has practically no stability during the hovering phase. Thus, even a very brief drop-out of the control system can easily lead to a crash. For this reason, redundancy operation is required so that in case one control circuit becomes defective, it can be taken out of operation, and there still is at least one or even more control circuits available to maintain operation.

Different types of redundancy systems are known. For example, multiplex control systems are known and here, for example, a particular triplex control system has been disclosed in German Pat. No. 1,277,677. An error in this threefold redundancy control system is determined in accordance with the majority principle, i.e., if one out of three parallely operating control circuits provide an output that differs from the outputs as provided by the two others, that one is regarded as faulty, as it is extremely unlikely that the onset of defective operations concurs in two independently operating control circuits. Therefore, if the output of one of these control circuits deviates from the outputs of the two others, by a value that exceeds a predetermined threshold, an error indicator responds and disconnects that particular control circuit. It is pointed out that for recognition of a first error, the majority principle may well be used also in the present system.

The particular problem now arises, if after disconnection of a first, faulty control circuit, another one of the two remaining control circuits drops out. The faulty circuit has to be disconnected, for example, manually by means of a switch, which is actuated by the pilot and may be connected to an operated in response to the position of the control column. Immediate manual disconnection is very difficult because the pilot has to react in a fraction of a second to avoid incorrect position or attitude or multiplied effective load as it may result from an incorrect maneuver and as possibly induced by the second faulty control circuit. Most importantly, however, the pilot has to recognize which one of the two circuits has become defective. Should the output of the defective one drop to zero suddenly, that can be easily recognized. But errors do not always show up in that simple a manner. One of the circuits may begin to deteriorate rather slowly. Also, erronous outputs may be too low or too high.

The invention avoids these difficulties. In particular, it is suggested to feed the outputs of two out of three remaining control circuits into two separate signal paths. A resistive summing network averages the outputs of the two circuits to provide an averaged input for the actuator that is to respond to the signals of the control circuits. Additionally, the two outputs are used to control a differential amplifier whose output is a first representation of existence and of relative polarity of a faulty operation of one of the remaining two control circuits, should such error occur. A second representation is provided whose polarity or other directional indicator represents direction of required or induced correcting maneuver in case of error (within the meaning of feedback control). Signal manifestations of the two representations are provided and combined to obtain selection of the faulty circuit, and to obtain immediate disconnection of that circuit so that control operation remains directly in the sole, remaining operative control circuit.

The invention permits ready recognition of the defective one, out of two parallely operating control circuits. As the resistive summing network averages the signal outputs of the two control circuits for operating an actuator, any error in one of them is not directly effective in the actuator, but only half of its difference from the output of the correctly operating one. Moreover, the resulting modification in inputs for the control circuits will cause the still correctly operating circuit to introduce a signal that tends to offset the error. This offsetting of error is important, as it prevents the faulty control circuit from taking over immediately.

The arising difference in outputs of the two control circuits is a readily available, first representation of error, and the polarity of that difference is one indicator that will lead to recognition of the faulty control circuit. However, this first representation is ambiguous as a faulty control circuit may, by the particular nature of the error, provide an output that is too large or one that is too small. To resolve the ambiguity, reaction to the faulty operation is processed, and the direction (polarity) of that reaction is used accordingly.

For example, due to the averaging operation on the input of the actuator, and due to the tendency of the non-defective control circuit (through feedback) to correct the operational error as resulting from the incorrect output of the defective circuit, the error does not materialize drastically, in a sudden deflection of the controlled surface. Thus, there is sufficient time for the pilot to react and to operate the control column. He will do so in a manner aiding in the correcting maneuver. The resulting particular displacement of the control column is used together with the polarity in the difference between the two outputs to detect the faulty one of the two control circuits and to disconnect it automatically. Immediately, the remaining operating circuit takes over completely.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

The FIGURE illustrates a circuit diagram showing the preferred embodiment of the present invention.

Proceeding now to the detailed description of the drawings, in FIG. 1 thereof there is illustrated somewhat schematically a plurality of altogether three control circuits 1, 2 and 3, which all operate normally in parallel, but as autonomous branches for and through independent processing of similar input signals or of input signals representing similar events or functions. Normally, with all three circuits, 1, 2 and 3 operating without defect, contacts 5, 6, 7, 8, 9 and 10 of a switching system 4 are all closed. The normal operational state is particularly defined by production of similar outputs by all three control circuits, within particular tolerances, of course.

Contacts 5, 7, and 9, when closed respectively, connect the outputs of control circuits 1, 2 and 3 to a line 15. That line is under control of normally closed switch $a_1$. The three control circuits outputs are additionally connected in parallel via closed switches 6, 8 and 10 to a line 16 which is under control of a normally closed switch $b_1$. A pair of similar resistors 19 and 20 are serially connected between lines 15 and 16. The resistors provide the sum of the signals in lines 15 and 16. The junction between the resistors taps half of the sum, so that the two-fold averaged output of the three control circuits is derivable from the junction. The junction between the two resistors 19 and 20 connects to the input of a commonly operated actuator 100, which may be a hydraulic servo booster or the like for operating flight control surface (s).

The invention is particularly designed, as stated above, for providing particular control operations in case one of these three control circuits has been disconnected for reason of faulty operation. This is a particular operating state of the system as illustrated in FIG. 1, where it has been assumed that the control circuit 1 was found to be defective and has already been disconnected to establish a particular switching state as follows: An error indicator 41 has operated the switching system in that the two switches 5 and 6 have been opened, so that the two output paths from control circuit 1 are both disconnecting from the remainder of the circuit, and from lines 15 and 16 in particular. A suitable error indicator is, for example, disclosed in British Pat. No. 1,074,703, published July 5, 1967. Normally, control circuit 2 is connected to the system via a twin path which is governed by the pair of switches 7 and 8. Having found control circuit 1 faulty, switch 7 is opened and switch 8 remains closed. Therefore, the output of the control circuit 2 is now connected to line 16 only. The control circuit 3 has its output normally connected to the two lines 15 and 16, respectively, through closed switches 9 and 10. After control circuit 1 was found faulty, switch 10 has been opened so that the output of control circuit 3 remains connected to line 15 only, via switch 9.

This can be generalized in that the error indicator 41 provides particular circuit connection after any one of the three control circuits 1, 2 or 3 (but only one) was found faulty and had been disconnected. The switching state then established by operation of the contacts 5 through 10 causes but one of the still operative control circuits to remain connected to line 15; the other one remains connected to line 16 only. While the operation of error indicator 41 is conventional, it should be mentioned briefly that, for example, the output of each control circuit is compared separately with the input as applied to actuator 100, and if the respective control circuit output deviates from the averaged one by a value exceeding a response threshold, that control circuit is removed and the others remain connected, but each having its respective output applied to only one of the two lines 15, 16. Therefore, in response to error conditions, switching operations may be established which do not require elaboration and in which error conditions as detected by indicator 41 are associated with particularly closed and opened switching states of switches 4. These states can be summarized, for example, as follows in the table below.

| Switches | Faulty None | 1 | 2 | 3 |
|---|---|---|---|---|
| 5 | closed | open | closed | open |
| 6 | closed | open | open | closed |
| 7 | closed | open | open | closed |
| 8 | closed | closed | open | open |
| 9 | closed | closed | open | open |
| 10 | closed | open | closed | open |

The output signals from the controllers as they are applied to the lines 15 and 16 are normally passed through closed contacts $a_1$ and $b_1$. The resistive summing network comprised of the two resistors 19 and 20 still provides the sum of the two respective signals as they are developed in the lines 15 and 16 by operation of two control circuits still on line; in the illustrated case these are the control circuits 2 and 3. As the actuator input is taken from the junction between the two resistors 19 and 20, the actuator input is thus half the sum, i.e., still the average of the two signals in the two signal paths. As long as these control circuits operate without error, the two output signals are similar within a range of tolerances, so that a signal that is still lower in tolerance, is applied via the resistors 19 and 20 to actuator 100.

In addition, line 15 is connected via a resistor 21 to a first input 24 of a differential amplifier 23. Line 16 is connected serially through a resistor 22 to the second input 25 of a differential amplifier 23. The particular input 25 of differential amplifier 23 is also connected to ground, first via a resistor 27 and additionally through a capacitor 29 as connected across resistor 27. On the other hand, the output of the amplifier 23 is coupled back through a resistor 29 to input 24 of the amplifier. There is additionally a capacitor providing an AC feedback path parallel to the DC coupling as provided by resistor 29. The amplifier has, thus, operational amplifier characteristics.

It can readily be seen that the differential amplifier 23 develops an output signal that is proportional to the difference of signals in lines 15 and 16. As long as all three control circuits operate properly, the signals in lines 15 and 16 are necessarily equal as each line receives the same three outputs, so that the output of differential amplifier 23 is necessarily zero. It should be noted, that the output of differential amplifier 23 remains zero even if one out of three control circuits tends to produce a false output, as that output is, at the time, still fed to both inputs or the amplifier.

As soon as one of the control circuits has dropped out, i.e., has been disconnected, the output of differential amplifier 23 represents the difference (if any) in outputs of the two remaining control circuits.

As a general rule, the amplifier 23 is controlled to develop a positive output if the input at terminal 25 is more positive relative to the input at terminal 24, irrespective of the absolute polarity of either signal relative to ground. The amplifier output is negative in case the inputs have the opposite relation. The particular non-zero output as provided by amplifier 23 is to be used in case of further dropout as will be developed more fully below.

The output terminal 26 of differential amplifier 23 is coupled to the base electrode of a PNP transistor 31 as well as to the base electrode of an NPN transistor 32. The emitters of the two complementary transistors each are connected to ground. The collector of PNP transistor 31 is connected through the coil of a relay C and via a normally closed contact $d_1$ to a source of negative potential. The voltage source providing negative potential has its positive terminal connected to ground. Analogously, the collector of NPN transistor 32 is connected to the coil of relay D, and the other end of the coil connects to a source of positive potential via a normally closed contact $c_1$. The particular voltage source furnishing that positive potential has its negative terminal connected to ground. Of course, contact $c_1$ and others pertain to and are actuated by relay C, and contact $d_1$ and others pertain to and are controlled by relay D.

Switching circuit 4 includes two more contacts, 11 and 12. These contacts are normally open. However, upon response of an by error indicator 41 to an error condition in any of the three control circuits, contacts 11 and 12 close. Contact 11 connects a source of positive potential, as applied to a line 40, to the anode of an isolation diode 42 having its cathode connected to a bus 44. Analogously, contact 12, when closed, applies the same or similar positive potential but separately via line 41 to the anode of a second isolation diode 43 having its cathode also connected to bus 44. For each of these sources of positive potential there is a corresponding negative terminal which is connected to ground.

The independent and separate providing of positive voltage potential to bus 44 is again a safety measure, i.e., it is a redundancy provision, to make certain that in case of a control circuit error positive potential is applied for the first time to bus 44. In case of a short circuit in either of these lines 40 and 41, the isolation diodes prevent the operating one from feeding into the short circuit of the defective one, causing the operating source to become likewise defective, for example due to overload. Therefore, the two diodes 42 and 43 and the two switches 11 and 12 couple the same or similar power supply separately and independently from each other to control bus 44 so as to prevent transmission of defects from propagating further.

Line 44 serves as a bus which receives voltage potential each time one of the three control circuits has dropped out and, thus, prepares for the case a second one of the control circuits has to be disconnected. A particular switching circuit is provided to connect one of the coils of two relays A and B to bus 44. The respective other ends of the relay coils are connected to ground. The switching circuit provides energization for but one of the relays, A and B, and only in case a second control circuit exhibits error. The switching circuit is part of the scheme to detect which one of two control circuits is faulty so that it can be disconnected. The respective selection is made by two actuator switches S1 and S2, which are actuated by and in response to control column operation.

The switching circuit provides the following energization and possible switching paths. The first path leads from bus 44 through a normally open contact $a_2$ directly to the coil of relay A to serve as holding circuit for the A relay. Relay B has also a holding circuit, in that a normally open contact $b_2$ will connect bus line 44 to relay B after response and for continuing energization thereof. The actual operating and energizing circuits for the two relays are as follows:

The circuit has two branches governed by a make and break contact blade $d_2$. Each of the two branches may lead to energization of either relay A and B, but to the exclusion of the respective other one. As relay A actuates, among others, contact $a_1$ and relay B actuate, among others, contact $b_1$, relay A is to be controlled to disconnect a faulty control circuit that feeds line 15, while relay B is to be controlled to disconnect a faulty control circuit that feeds line 16.

Switching contact $d_2$ is one of the blades of relay D, and in case relay D is not energized, the contact $d_2$ has the illustrated position, connecting bus 44 to one side of a movable contact $C_3$, which is normally open. The switching path governed by switch blade $C_3$ leads either through the contact 49 of Switch S1, in the illustrated position, to a contact which may make contact with the blade 51 of switch S2, that blade having normally the illustrated position and governs directly the energization path to the B relay. In the alternative position of blade 49, a possible switching path runs through the second contact 50 of the switch S2 in the illustrated position to the relay A.

In the alternative position of switch $d_2$, a switching path runs through the normally closed contact $C_2$ pertaining to the C relay and to a second movable contact 48 of switch S1. In the illustrated position, the connection leads to a contact which may engage the blade 50 of switch S2 when in the alternative position so as to energize the relay A. In the alternative position of blade 48, a switching path exists via the blade 51 of switch S2 in the illustrated position to relay B.

After having described the general layout, and particularly the possible switching states of the several contacts, the operation of the circuit is as follows. First of all, the operational state is to be summarized in case all of the control circuits 1, 2 and 3 operate without error and no error has been detected. In this case, error indicator 41 has all contacts 5 through 10 closed; contacts 11 and 12, however, are open so that regardless of any operation of the switches S1 and S2 relays A and B cannot be operated. With contacts 5 through 10 closed, the outputs of all three control circuits 1, 2 and 3 are directly applied to lines 15 and, separately, to line 16. Therefore, the same signal is applied across resistors 19 and 20 so that the input terminal of actuator 100 receives a summed and doubly averaged input signal to operate a particular control surface.

The summation and averaging may have the effect of overall reduction in operational tolerances. On the other hand, the two inputs of differential amplifier 23 receive similar inputs so that its output is zero. The amplifier output can be adjusted that in this operational state terminal 26 is dynamically maintained at ground potential, so that none of the two transistors 31 and 32 is conductive and the relays D and C are accordingly unenergized.

Now it is assumed that one of the controllers becomes faulty. Since in the normal operational state the output of each control circuit is applied to both inputs of differential amplifier 23, any relative change is not detected by that amplifier. Also, contacts 11 and 12 are still open so that relays A and B cannot possibly respond to that error. The first error is, thus, detected, by indicator 41 only.

As stated above, it was assumed that control circuit 1 was the faulty one, so that response of error indicator 41 caused contacts 5 and 6 to open, and contacts 7 and 10 are opened also by operation of switching arrangement 4. Thus, the output of control circuit 2 is applied via closed contact 8 to input 25 of differential amplifier 23. The output of controller 3 is applied via contact 9 in a line 15 to input 24 of the differential amplifier. As long as these two control circuits continue to operate faultlessly, within the chosen tolerance limit, the output of the differential amplifier 23 does not deviate from ground potential, at least not sufficiently to cause either of the transistors to conduct for overcoming the response threshold of the relays C and D. On the other hand, actuator 100 receives still the average of the two outputs of control circuits 2 and 3. Thus, the actuator does not "see" the dropout of circuit 1.

As soon as one control circuit drops out, contacts 11 and 12 close to bias bus 44 which will assume positive potential. A brief remark is necessary concerning the relays A and B, particularly as to the operating conditions that prevail as long as two control circuits operate in parallel and without errors. It can be seen from the state of the relays, energization paths do not exist to either relay A or B as long as contacts $c_2$, $c_3$ and $d_2$ do not change position, i.e., as long as relays C and D have not responded, relays A and B cannot respond, irrespective of any change in position of switches S1 and S2. This is so as neither switching path to blades 48 and 49 receives any voltage.

Now it is assumed that for any reason another one of the control circuits exhibits a defect and tends to falsify operation. For this, it should be noted, that in case of an imbalance in outputs of the two control circuits 2 and 3 the faulty one may produce an output that is too high, or an output that is too low. Thus, the polarity of any difference in outputs is not per se an indication as to which one of the circuits is the defective one. On the other hand, it is clear that in the summing network 19–20 the faulty control circuit tends to introduce a signal that is not correct as to the output needed under the circumstances. Thus, the inputs for the several circuits will vary to cause the servo system generally to provide a stronger control, the output of the non-defective circuit will tend to offset the error that is being introduced. This means that (a) the difference in outputs of the two control circuits tends to increase, which is desirable for fast error recognition, and that (b) the average as formed by the summing network is not too far from the correct value needed. Thus, the craft does not drop suddenly into an uncontrolled state.

It may now be assumed (but not "known") that control circuit 3 is faulty and has to be disconnected from the system; additionally it is assumed that the output signal of control circuit 3 is more positive than the output of control circuit 2, so that the signal in line 15, as applied to terminal 24, is more positive than the signal applied by line 16 to the input terminal 25. Accordingly, the output signal of differential amplifier 23, as taken from its output terminal 26, is negative relative to ground, particularly because the relative potential of input 25 determines the potential of the output. Thereupon, transistor 31 is rendered conductive and relay C responds.

First of all, contact $C_1$ opens to prevent a subsequent response of relay D for reason of transients. Next, contact $C_2$ closes. Basically, the circuits for the A and for the B relay are now prepared for energization, but will not be energized for the normal switching state of switches $S_1$ and $S_2$. The distinction is now made by the pilot, namely by his reaction to the ensuing error. As the faulty input to actuator tends to direct the craft incorrectly, the pilot will tend to introduce corrective maneuvers through particularly manipulating the control column. In one case, he will move the column so that switch S1 changes positions, in other case, switch S2 changes position. That distinction is used for selection as to which one of the control circuits is defective. Under the particular circumstances there is definite relation between the "sign" of the error and the direction of the corrective maneuver.

Assuming, the pilot reacts so that switch S1 changes position, in this case blade 49 changes position and the A relay is immediately energized, via contact $d_2$ in the illustrated position, contact $c_3$ as closed, contact 49 as having changed position, and contact 50 as in the illustrated position. As soon as the A relay is energized, contact $A_2$ closes to retain relay A in an energized state irrespective of any further change in state, for example, of the switches S1 and S2. The principle operation of relay A however is to open contact $a_1$ so as to disconnect control circuit 3 from line 15. That control circuit has now been dropped.

As control circuit 3 is disconnected, control circuit 2 takes over completely. It will be noted that no further averaging operation takes place in summing network 19-20, because with contact $a_1$ open that side of resistor 19 is floating so that the input to actuator 100 is the signal in line 16 itself.

Analogously, had the pilot reacted differently for the same polarity of signal differences as detected by amplifier 23, the control circuit 2 would have been the faulty one. As the output of differential amplifier 23 is the same (negative) relay C closes contact $C_3$, but now switch S2 changes position and relay B is energized accordingly. Thus, control circuit 2 will be disconnected by opening of contact $b_1$. In either case, the still correctly operating control circuit will take over as soon as the faulty one is disconnected and normal operation is resumed.

Thus, in case of a positive control signal differential a particular pilot's reaction may recognize the error as an output that is too large and that leads directly and properly to disconnection of circuit 3; when upon pilot's reaction the error is recognized as too small, circuit 2 is properly disconnected.

Assuming now that the output of control circuit 3 is more negative relative to the output of circuit 2, so that the input signal for terminal 24 of differential amplifier 23 is negative relative to the input signal as applied to terminal 25. Thus, the output of differential amplifier 23 turns positive to ground. It is important to remember that the polarity of the output of amplifier 23 does not depend on the polarity of the input signals individually, but only upon the polarity of the difference, whereby one input, for example, the input as applied to terminal 25, establishes the reference for determining the polarity of the difference.

A positive output of amplifier 23 renders transistor 32 conductive. Relay D is energized opening contact $d_1$ to prevent spurious response of the C relay. Upon response of relay D the positive of blade $d_2$ is changed, but contacts $c_2$ and $c_3$ remain in the position as illustrated. Both relays, A and B, are again prepared, now by the second branch and switching path as leading from bus 44 through the changed position of blade $d_2$ and the normally closed contact $C_2$. Again, a particular error will result in pilot's reaction, but now in the opposite direction. In the first mentioned case, response by the pilot to move the control column in a particular way caused the switch S2 to change position which resulted in response of relay B, disconnecting control circuit 2, thus recognized as faulty. Now, the same reaction by the pilot will again cause switch S2 to change position. However, upon such change in position of the control dolumn for the resulting change in the position of blade 50, the A relay will respond. Thus, in this situation, the normally closed contact $a_1$ opens and control circuit 3 is recognized as faulty and disconnected. Again, of course, relay A maintains energized through the normally open contact $a_3$ which is now closed to retain the energized state of relay A; control circuit 3 must remain disconnected.

It is readily apparent that the opposite reaction by the pilot leads to a change in position of switch $S_1$, the B-relay energizes and disconnects circuit 2.

In summary, the A and B relays operate in response to signals which can be represented by the following Boolean equation:

$$A = (C \cdot \bar{D} \cdot S_1 \cdot \bar{S}_2) + (\bar{C} \cdot D \cdot \bar{S}_1 \cdot S_2)$$
$$B = (C \bar{D} \cdot S_1 \cdot S_2) + (\bar{C} \cdot D \cdot S_1 \cdot \bar{S}_2).$$

The state $C\bar{D}$ is true always for negative output of amplifier 23 and when the signal in line 16 (terminal 25) is more negative relative to the signal in line 15 (terminal 24), regardless of which control circuit is connected thereto. The term $S_1 \cdot \bar{S}_2$ represents a pilot's reaction (operating switch $S_1$) recognizing the signal in line 15 as erroneous for $C\bar{D} = 1$, and relay A responds. The term $\bar{S}_1 \cdot S_2$ represents the opposite reaction by the pilot (operation of switch $S_2$) impliedly recognizing the signal as applied to line 16 as erroneous, and relay B responds. In case $\bar{C}D = 1$ for positive output of amplifier 23, exactly the inverse relations are true. It can readily be seen that these relations are true, regardless which two of the three control circuits, 1, 2 and 3 are connected to the lines 15 and 16.

From a different point of view, a pilot's reaction causing him to operate switch $S_1$ ($S_1 \cdot \bar{S}_2 = 1$) causes line 15 to be disconnected for a negative output of differential amplifier 23, or line 16 is disconnected for a positive output by the differential amplifier; in the first instance a control circuit output that is too large was recognized as erroneous; in the second instance a control circuit output that is too low was recognized as erroneous. The distinction is provided by the differential amplifier. An oppositely directed pilot's reaction causes the circuit to operate inversely.

It should be noted, that the circuit has been described in relation to an embodiment using electromechanical relays. It is apparent that electronic relays and switches, as well as electronic logic circuitry, can readily be employed.

The invention is not limited to the embodiments described above but all changes and modifications thereof not constituting departures from the spirit and scope of the invention are intended to be included.

We claim:

1. In a flight control circuit, having three parallely operating control circuits branches, at least one of which is to continue control operation in case the two others have dropped out, comprising:

a first and a second signal path, each connected to the output of each of the control circuit branches, there being switching means interposed to disconnect a faulty one of the circuit branches, while respectively causing one of the two others to be connected to the first signal path only, the other one of the two others to be connected to the second signal path;

first circuit means connected to the first and second signal path to provide a combined output as derived from the respective connected ones of the three branches, to provide averaged flight control operation;

differential amplifier means, having two inputs connected respectively to the first and second signal path to provide a control signal having polarity in dependence upon the relative polarity of difference between the two signals as effective in the two signal path;

second circuit means connected for providing first and second switching states in response to corrective operational response of the craft to the faulty signal; and third circuit means connected to the differential amplifier means to be responsive to the control signal and further connected to the second circuit means to disconnect a faulty one of the remaining two control circuit branches from the first circuit means.

2. In a circuit as in claim 1, the second circuit means including a first switch actuated by the control column of the craft in response to a corrective actuation thereof in a first direction, to establish the first switching state and including a second switch actuated by the control column of the craft in response to a corrective actuation thereof, in the opposite direction, to establish the second switching state.

3. In a circuit as in claim 2, the third circuit combining the switching states of the second circuit with the control signal as provided by the differential amplifier, to obtain a first disconnect operation for the first signal path, and a second disconnect operation for the second signal path in mutually exclusive relationship.

4. In a circuit as in claim 2, there being first and second switching means connected to the output of the differential amplifier to be respectively actuated for positive or negative output of the differential amplifier as respectively produced in response to the relative polarity between the two inputs thereof, the third means including first switching means disconnecting the first circuit path in response to operation of the first switching means and of the first switch, or in response to operation of the second switching means when concurring with operation of the second switch; the third means including second switching means disconnecting the second circuit path in response to concurring operation of the first switching means and of the second switch as well as of the second switching means and of the first switch.

5. In a circuit as in claim 1, the third circuit indlucing a pair of complementary transistors in common emitter circuit, having their base electrodes connected to the output of the differential amplifier, and having relays connected in their respective collector circuits.

6. In a circuit as in claim 5, the relays each including a normally closed contact in series with the collector circuit that includes the respective other relay.

7. In a circuit as in claim 5, the third means including first and second relay means respectively controlling the first and second signal paths, and connected to be controlled by the relays as controlled by the transistors of the pair, the second means including a pair of oppositely operated switches, the latter switches connected for selecting energization of the first or of the second relay means in response to particular relay energization as provided by the state of conduction of the transistors.

8. In a circuit as in claim 1, the third circuit means including means operating to cause the disconnected of the circuits to remain disconnected independent from subsequent change in output of the amplifier means and of the second circuit means.

9. In a circuit as in claim 1, the third circuit means provided for operating the first and second signal paths, there being means (a) to apply power to the third circuit means for such operation in case not all three control circuits are operating, there being means (b) rendering the first and second switch states of the second means ineffective as long as the differential amplifier means provides outputs below a response threshold for fault recognition.

* * * * *